M. B. LLOYD.
TUBE WELDING MECHANISM.
APPLICATION FILED DEC. 1, 1913.
1,124,764.
Patented Jan. 12, 1915.
4 SHEETS—SHEET 4.
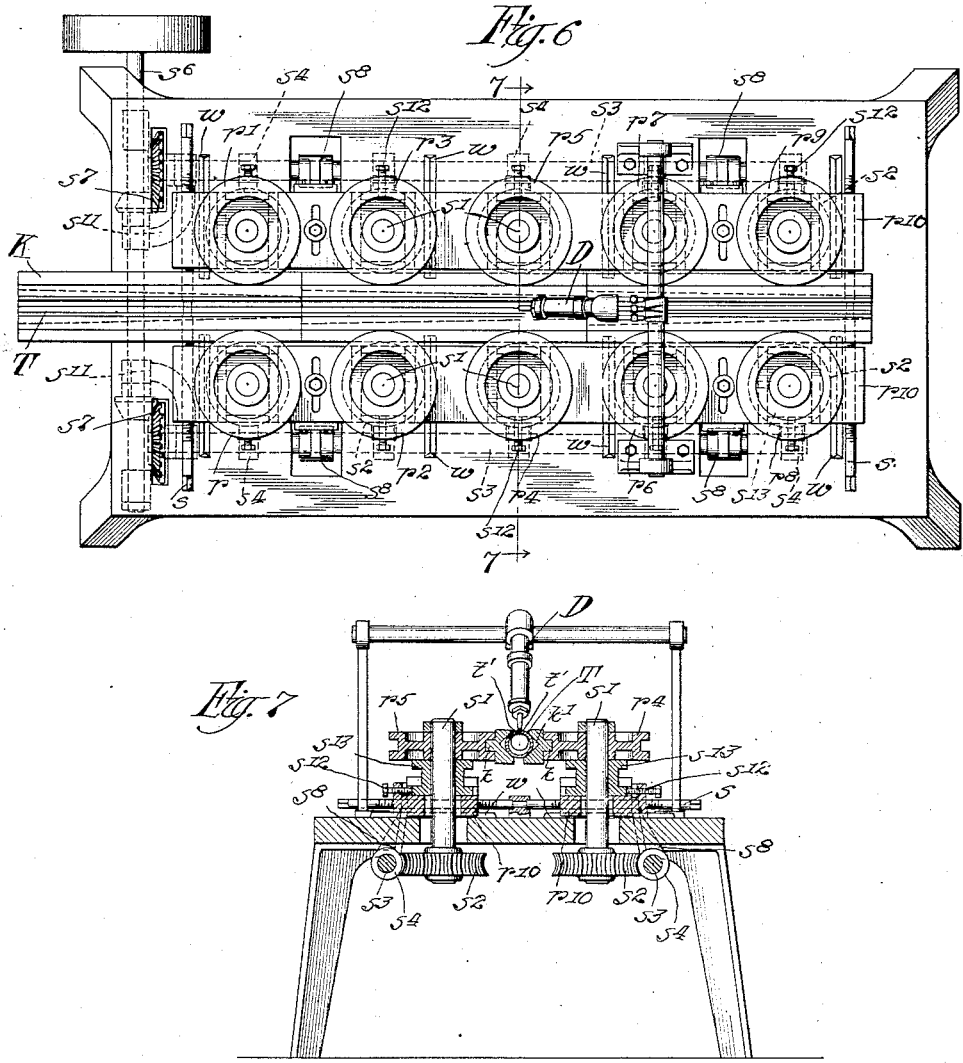
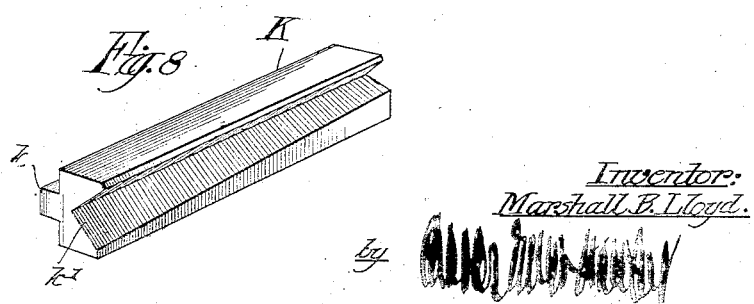

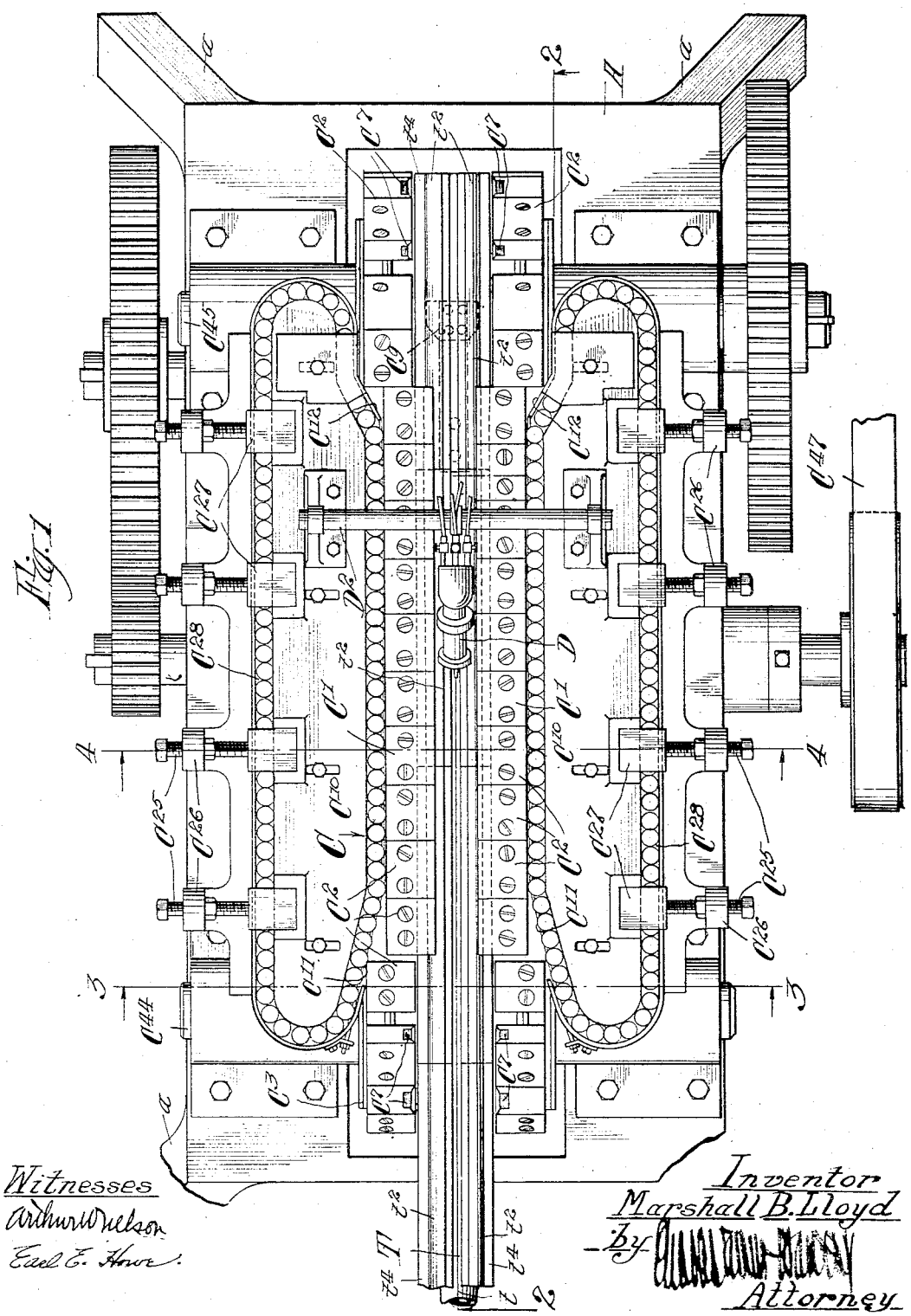

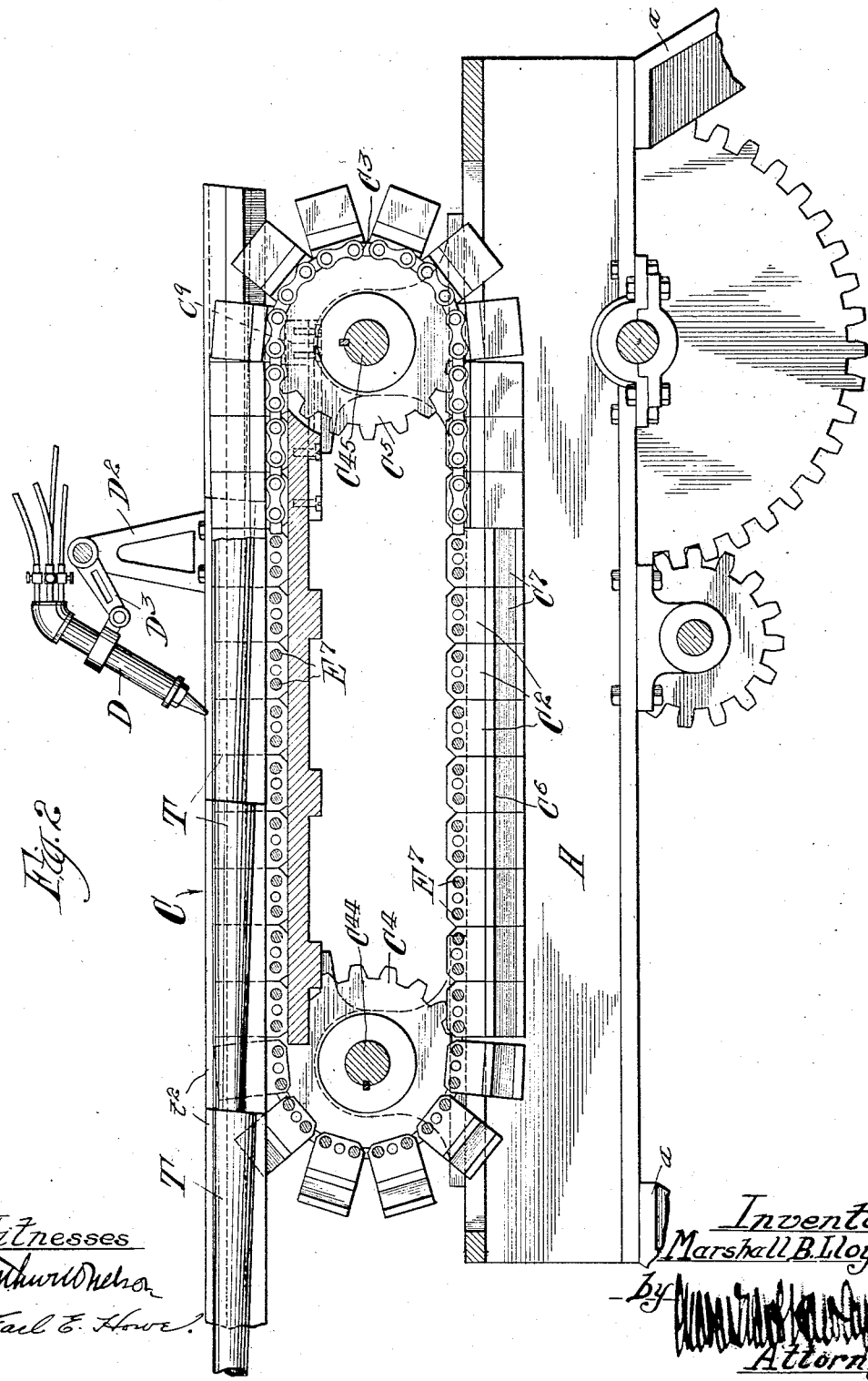

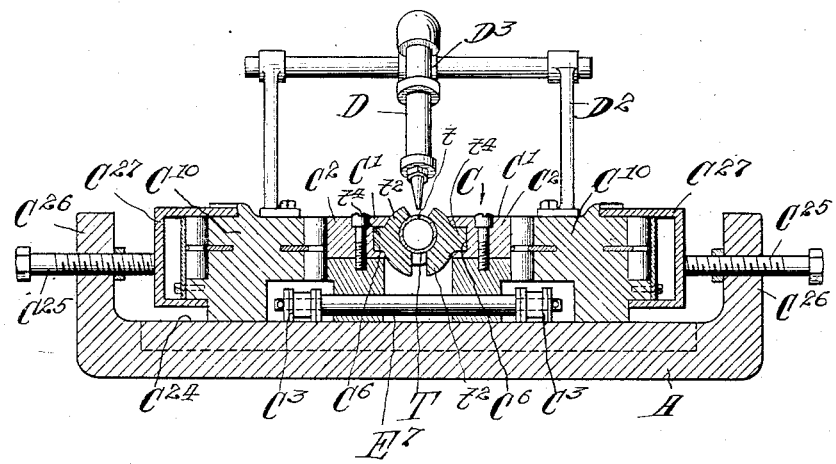
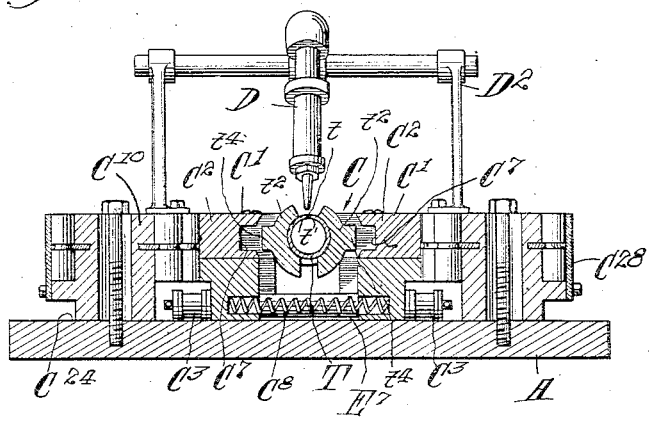
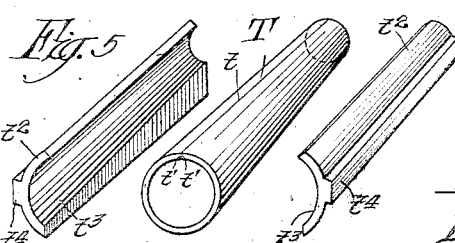

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDING MECHANISM.

1,124,764.      Specification of Letters Patent.      Patented Jan. 12, 1915.

Application filed December 1, 1913. Serial No. 804,093.

*To all whom it may concern:*

Be it known that I, MARSHALL B. LLOYD, a citizen of the United States, and a resident of Menominee, Menominee county, Michigan, have invented certain new and useful Improvements in Tube-Welding Mechanism, of which the following is a specification.

My invention relates generally to mechanism for manufacturing tubing and has special reference to mechanism for welding pre-formed tapered, conical, and similar tubes.

The general object of my invention is to provide mechanism wherewith tapered tubes and the like can be conveniently, quickly, and cheaply welded.

A further object of my invention is to provide mechanism for welding pre-formed conical tubes and the like which shall be simple in construction and operation and shall act automatically and uniformly to weld and forward tubing which is presented thereto, and which shall be easily adjustable to accommodate and weld tubes of various sizes.

My invention consists generally in tube welding mechanism comprising means for holding and forwarding tapered tubes in combination with a relatively stationary device for fusing and welding the tube as it moves.

My invention consists further in mechanism for welding tapered tubes which comprises means for holding the tubes in end to end abutment and forwarding them definitely positioned under a heating device thereby progressively fusing and welding the tube seams.

My invention consists still further in the unique construction, arrangement and cooperation of parts whereby those objects named above, and others which will appear hereinafter, are attainable.

My invention will be more readily understood by reference to the accompanying drawings forming a part of this specification which illustrate preferred embodiments thereof, and in which:

Figure 1 is a plan view of mechanism embodying my invention; Fig. 2 is a longitudinal section thereof substantially on the line 2—2 of Fig. 1; Fig. 3 is a cross sectional detail substantially on the line 3—3 of Fig. 1 showing the moving holder about to clamp the tube; Fig. 4 is a cross-sectional view substantially on the line 4—4 of Fig. 1, showing the moving holder embracing the tube; Fig. 5 is a perspective view showing a tapered tube and a pair of holding blocks therefor; Fig. 6 is a plan view of a modified form of my invention; Fig. 7 is a cross-sectional view on line 7—7 of Fig. 6; and Fig. 8 is a perspective view of a tube clamping block of modified form.

My invention is concerned generally with, though not limited to, the formation of welded tubing by the oxy-acetylene process. In this process the tube, which is usually formed from sheet metal, has a longitudinally disposed seam defined by the tube edges which are substantially in abutment. This tube is moved under an oxy-acetylene torch which heats the tube; and which, in addition to application of pressure at that point, fuses the edges and closes the seam. To secure a product of uniform strength and appearance, it is absolutely necessary that the working relation between certain parts be accurately determined, controlled, and regulated. Some of the more important factors in the production of welded tubing are: 1. The character of the welding flame; 2. The thickness and texture of the metal; 3. The speed at which the article is moved under the welding flame; and 4. The position of the seam of the tube relative to the torch and particularly the distance of the seam from the flame. When ordinary cylindrical tubing is being welded it is comparatively easy properly to control these factors. For instance, it is not a difficult matter to maintain the proper distance between the tube seam and the torch, since by simply gripping successive portions of the cylindrical tube it assumes positions equidistant from the torch. When, however, an article or tube which is not cylindrical in form is to be welded other problems present themselves which complicate the matter, such, for instance, as the problem of maintaining the seams of a number of short length pieces the proper distance from the torch. Hitherto no suitable mechanism has been provided whereby such articles as tapered or conical tubes can be quickly, easily and uniformly welded, and it is the purpose of my invention to provide novel mechanism for that purpose.

Referring now to the drawings, I shall describe in detail my unique mechanism which overcomes the objections and difficulties named, and which is well adapted to the economical production of welded, tapered, and other similar shaped tubes and articles.

A represents a strong branch or table supported at suitable and convenient height by legs $a$ and upon this table I mount the various mechanisms for acting upon the tube.

C represents a continuous vise or conveyer which is characterized by two opposed endless gripping portions $C^1$ $C^1$. As will be explained more fully hereinafter, it is composed of and divided into pairs of opposed jaws $C^2$ which move successively into alinement with and grasp the article to be drawn.

T represents a typical form of tube such as I contemplate welding and as will be seen it is a tapered tube. The tube is usually made of sheet metal and when formed a longitudinal seam $t$ results, which is defined by the edges $t'$, $t'$, which are in substantial abutment. It is this seam which is to be closed by the application of heat and pressure. It will be readily seen that if the tapered tube or cone were simply presented to the vise, each pair of vise jaws, in order that they be adapted to grasp the tube, would have to be made in a particular manner and assembled on the machine in a definite predetermined position. Several undesirable results would follow from such a construction. One would be that the length of the vise would have to correspond exactly to a given number of lengths of the tubes. It follows from this that if the length of the cone or tube were merely altered, the length of the vise would either have to be altered or else it would be incumbent upon the operator to allow one or more of the pairs of jaws to pass before presenting the next tube. This would be impracticable for the reason that the space between the tubes would permit the torch to burn into or eat away a portion of the end of the tube as it approached. This is one of the results which I desire particularly to avoid since my main purpose is to provide a machine for manufacturing tubing rapidly and economically and the result of such construction would be that a portion of each of the tubes would be wasted.

Another defect of making the vise jaws to grasp the article directly is that for each change in length of the tube new jaws would have to be applied. This would be extremely inconvenient, especially in shops where articles of various sizes are promiscuously welded. These fatal defects I remedy in a simple and unique manner which will be best understood by referring particularly to Fig. 5. The tube T is represented as the unit which may be of any desired length and of any desired taper. For holding the tube I provide two blocks or holders $t^2$ which have inner concavities $t^3$ for complementary engagement with the tube. As is best shown in Figs. 3 and 4 these blocks embrace substantially all of the tube exposing however a portion adjacent the seam to permit the torch to play a flame upon the tube at that place. The two blocks $t^2$ are placed on the tube and the three parts then started into the vise or moving holder. The further operation of these parts will be better understood by a more detailed description of the moving holder. This mechanism, as before briefly described, is characterized by two endless gripping portions $C^1$, $C^1$, divided into and composed of pairs of sections or jaws $C^2$ which move successively into alinement for clamping the tubes or in this instance the blocks $t^2$ in closing the tube. The jaws $C^2$ are arranged in pairs and are mounted upon two parallel endless chains $C^3$ running over corresponding sprockets $C^4$ and $C^5$ respectively. The jaws comprise small blocks of metal having opposed gripping faces $C^6$. I provide in the blocks means for gripping the holders $t^2$. In this instance I have provided on each of the holders $t^2$ a longitudinal projection or rib $t^4$. When the blocks are placed upon the tube these ribs run parallel with the seam. For complementary engagement with these ribs, I provide recesses $C^7$ which conform to the cross-sectional shape of these ribs or projections and hence as the blocks move successively into the working stretch they grip the ribs $t^4$ and by means thereof exert their clamping pressure around substantially the whole circumference of the tubing. The jaws are laterally slidable or movable upon the connecting rod $E^7$ extending between corresponding points on the two chains or belts, two of these rods being provided for each pair of jaw sections to insure their stability and prevent them from tilting. Between each pair of jaws I interpose a small spring $C^8$ to keep the jaws normally open so that as they rise around the forward end of the vise they will properly pass into alinement with the ribs $t^4$ of the tube clamping blocks, and as they move downwardly away from the tube and its holding blocks they will spread and release the blocks and tubing. At the delivery end of the welding machine, however, I prefer to provide a positive spreader or opener $C^9$, (see Fig. 1) which is positioned in the path of the jaws and which positively wedges or spreads them apart at that point. The jaws are automatically closed upon the tube or rather upon the blocks holding the tube by two cams or guide members $C^{10}$ which are parallel with the upper side or working stretch of the vise. These form a groove or channel through which the jaws or sections travel in succession. The forward or receiving end $C^{11}$ of these pressure guides are flared or arranged as cams so that as the jaws rise or enter the forward end of the channel they are caused gradually to move toward each other and into clamping engagement with the tube blocks, in which condition they are maintained until they reach the spreader at the opposite ends of the channel. The opposite ends $C^{12}$ of the guide members are also flared or cut away to allow the jaws to open as the spreader enters them. The guide members $C^{10}$ are slidably mounted upon the bed plate $C^{24}$ of the machine and may be adjusted by means of the screws $C^{25}$ so that the clamping pressure of the vise may be regulated to any degree found to be suitable for the purpose. They may also be readily adjusted to accommodate the different sized tubes. The adjusting screws are mounted upon upstanding lugs $C^{26}$ and they set against U-shaped members $C^{27}$ which bridge roller races $C^{28}$ and have their ends set in sockets provided therefor on the guides.

The forward sprockets $C^4$ of the vise are mounted upon a shaft $C^{44}$ journaled in bearings fixed on the bench and the rear sprockets $C^5$ are mounted on the rear shaft $C^{45}$ journaled in similar bearings fixed on the bench. Any suitable power gearing such as indicated in the drawings, may be employed for driving the power shaft $C^{45}$. The belt $C^{47}$ represents the source of power transmitted to such train of gearing. By this means continuous movement may be imparted to the chains or conveyers causing successive pairs of opposed jaws to rise into working position and there to be moved together by the guide bars.

Mounted centrally over the opposed conveyers is an oxyacetylene torch D. This is supported upon a bridge $D^2$ by a bracket $D^3$ of such construction that the torch may be readily made to assume any angular position or various heights or distances from the tube as may be required to secure the proper welding flame for the particular character of the tube.

As stated in the opening of the specification, in order that uniform welding may be attained, it is necessary to maintain a given tube a definite distance from the torch. This it will be seen is automatically accomplished by my mechanism since the ribs or projections $t^4$ of the tube clamps are parallel with the tube seam. It necessarily follows therefore that as the conveyer blocks engage these ribs, the tube will automatically assume a straight line position. This action is very clearly illustrated in Fig. 2.

Having thus described the detail construction of the mechanism, I shall now briefly describe the operation thereof. For this purpose let us assume that a number of tapered tubes are moving through the machine held between the tube blocks or holders $t^2$ and that one pair of blocks, and the tube held thereby, project slightly from the feed end of the machine. I now prepare another tube for welding by placing it within a pair of tube blocks $t^2$ with the seam of the tube uppermost and exposed centrally between the blocks. I then place the tube and tube blocks in this condition in end to end abutment with the forwardly moving tube and blocks in the machine, moving them forward in continued abutment until clamped by the constantly moving vise which then serves to forward the parts and to hold them properly upon the tube. By thus providing a number of sets of tube clamps or blocks $t^2$; placing lengths of tubing therein; and placing the parts so arranged in end to end abutment as before described the welding of short lengths may be carried on continuously. Because the tubes are in end to end abutment there is no possibility of the flame cutting away or eating into the end portions of the tubes in passing from one tube to another, since they constitute in effect one continuous tube while in the welding machine.

In Figs. 6, 7, and 8 I have shown a modified and simplified form of my invention which under some circumstances may be used to advantage. In this instance I provide a conveyer comprising a plurality of rolls $r, r^1, r^2, r^3, r^4, r^5, r^6, r^7, r^8$, and $r^9$. These are arranged in opposed pairs the number of which may be varied to suit the condition and the rolls $r, r^2, r^4, r^6$, and $r^8$, are mounted upon a single base $r^{10}$. So also the rolls $r^1, r^3, r^5, r^7$, and $r^9$ are mounted upon a similar base $r^{10}$. The bases $r^{10}$ are slidable to and from each other, moving in suitable ways $w$ and may be easily moved by means of the right and left hand threaded bolts $s$. Each of the rolls is secured to the upper end of a vertical shaft $s^1$, the lower end of which is provided with a worm gear $s^2$. Shafts $s^3$ are provided on each side of the machine and carry a number of worms $s^4$ which mesh with the worm gears $s^2$ of the shafts $s^1$ and the shafts $s^3$ are driven by means of the power shaft $s^6$ and gearing $s^7$. In this manner all of the rolls are driven at the same peripheral speed.

For holding the article to be welded I have shown a modified form of holder, as indicated in Fig. 8, which comprises an elongated bar of metal K provided with longitudinally extending ribs $k$ on one side and a V-shaped tapered groove $k^1$ in the other side. The position of the tapered groove upon the block corresponds to that of the groove $t^3$ as shown in Fig. 5, the difference residing in the shape of the groove. Two of these blocks K are used together in same manner as described in reference to Figs. 1 to 5 and when placed upon the article to be welded they are started into the first of the rolls $r$, $r^1$, and are thereby forwarded to the succeeding rolls. The relative length of the holders and the number and position of the rolls is preferably such that after the blocks are fully started into the machine, two or more pairs of rolls will constantly guide and forward the tube and its clamping blocks. The tube edges $t'$, $t'$, are welded in the manner already described by passing under the welding torch D. When it is desired to take widely differing sizes of tubes, the rolls on each side of the center may be moved by means of the screws $s$ which act upon the bases $r^{10}$. The driving connections are in no wise interrupted by this movement since the shafts $s^4$ are carried by bearings $s^8$ attached to the bases $r^{10}$. Likewise the driving connection $s^7$ is constantly maintained by means of the brackets $s^{11}$. With the blocks of the type shown in Fig. 8, however, considerable variation in the size of the tube to be welded can be accommodated without any great adjustment, because of the tapered groove construction. Furthermore, many different sizes of tubes may be gripped by the same holding blocks. To secure the limited adjustment which may be necessary to clamp slightly different tubes, or to secure the necessary pressure, I prefer to provide other adjusting means $s^{12}$ which act against blocks $s^{13}$ carrying the vertical shafts $s^1$ and other attached gears. In this manner the machine can be quickly and easily adjusted for all purposes.

I have so far described my invention with reference to the welding of tapered tubes, but it should be obvious that my invention is capable of use in welding cylindrical tubes which may be desirable for certain purposes, for example, when welding tubes which are very thin and flexible.

From this detailed description it is believed that the objects and advantages of applicant's invention will be readily understood by those skilled in the art, but since modified structures will readily present themselves to such men, I do not wish to be limited to the precise construction herein shown and described, except as may be necessary by express limitations in the claims hereunto appended.

I claim:

1. In a welding machine, a pair of tube clamps formed and adapted to hold a tapered tube, in combination with an endless conveyer for moving the tubes and clamps past a given point, a burner located at said point and acting to impinge a welding flame upon the same to be welded, and means for maintaining a substantially constant relation between the tube and the burner.

2. In a welding machine, a vise for clamping the metal to be welded, in combination with a conveyer for moving the vise past a given point, a burner located at said point and acting to impinge a welding flame upon the seam to be welded and means for embracing the tube and for complementary engagement with said vise for properly positioning the tube relative to the burner.

3. A machine for welding or similarly sealing the seam of metal tubes, comprising an automatic traveling holder formed progressively to grasp and forward an article with clamping blocks for embracing tubing and a stationary heating device located over said holder for heating and welding the seam while the tube is so held and moved.

4. In a mechanism of the class described, the combination for embracing tapered tubing with the seam thereof exposed, a moving holder for progressively gripping said means for embracing tapered tubing and for moving same forward, and a welding torch arranged in the path of the tube and positioned to direct a welding flame upon the tube.

5. In a machine for welding tapered tubes and the like, the combination of means for embracing a length of tubing with the seam exposed, an automatic traveling holder for gripping and forwarding said clamps and tube, a relatively stationary heating device for heating the exposed part of the tube and means formed on said tube clamps for complementary engagement with the moving holder and serving to position the seam of the tube in proper alinement with the heating device.

6. Tube welding mechanism comprising elongated tube clamps in combination with an elongated cyclically moving conveyer for gripping the clamps, and propelling them forward, a burner arranged intermediate the ends of the conveyer in position to weld the tube as it travels, and pressure mechanism for automatically causing a welding pressure at the tube seams.

7. A tube welding machine comprising a substantially horizontal conveyer having a plurality of clamps arranged in pairs, a channel arranged adjacent to upper side of said conveyer the walls whereof cause successive pairs of clamps to approach each other as they travel, tube length clamps for embracing tubing and formed to be gripped by the successively approaching pairs of clamps, a burner arranged above said conveyer in position to weld the seam of the tube while under pressure and means for positively opening said clamps after the welding operation.

8. A tube welding machine comprising a substantially horizontal conveyer, a plurality of lateral moving jaws arranged in pairs thereon, mechanism for closing pairs of jaws successively, pairs of tube length clamping blocks adapted to embrace tubing and to be grasped by the successively closing pairs of movable jaws, a welding burner adapted to heat the tube while moving and a spreader for positively opening the pairs of jaws successively to release the tube after it is welded.

9. A tube welding machine comprising a substantially horizontal traveling conveyer, a plurality of laterally moving jaws arranged in pairs thereon, a pair of tube length clamps formed and adapted to embrace a tapered tube, mechanism for automatically closing the pairs of jaws successively upon the tube embracing clamps, a heating device coöperating therewith to weld the tube while in said clamps and jaws, and a spreader for positively opening the pairs of jaws successively.

10. In a tube welder a relatively stationary burner, a constantly traveling carrier in combination with a pair of tube length clamps formed and adapted to embrace tapered tubing with the seam thereof exposed, said constantly traveling carrier formed and adapted progressively to grip the tube clamps to compress the tube therein and present the unwelded seam of the tube to the burner, and a pressure relieving device operable to relieve the tube of the compression action of said tube carrier after the seam of the tube is welded.

11. In a welding machine a constantly traveling conveyer for propelling a metal tube forward at constant speed, a stationary flame burner arranged above said conveyer and adapted to project a concentrated flame downwardly upon the seam of the tube and progressively weld said seam as the tube moves, in combination with two clamps formed and adapted to embrace a length of tubing and tube positioning means on said clamps coöperating with said traveling conveyer for automatically presenting and positioning the tube in reference to and under the flame burner, as and for the purpose specified.

12. In an automatic tube welder, a combined tube carrier, vise, and clamping blocks formed to embrace a length of tapered tubing, said tube carrier and vise operating constantly to grip successive portions of the tube clamps and automatically to apply pressure thereto to hold the edges of the tube seam in butt relation, in combination with a welding burner above said tube carrier positioned to play a flame upon the seam of the tube in the vise as it travels, and tube positioning means on said tube clamps coöperating with the carrier and vise and presenting said seam in proper alinement with the burner.

13. In an automatic tube welder, a carrier vise, and tapered tube embracing clamps, said clamps embracing a length of tubing and the carrier vise serving constantly to grip successive portions of the clamps and automatically apply pressure to the tube therein to hold the edges of the tube seam in butt relation, in combination with a welding burner above said tube carrier adapted to play a flame upon the seam of the tube as it travels, tube positioning means coöperating with said vise and carrier for presenting the unwelded seam of the tube in proper alinement with the burner and an automatic device for opening said vise as the tube leaves the combined carrier and vise.

14. A tube welder comprising a continuous moving tube carrier having a plurality of vise jaws, a plurality of tubing clamps formed to embrace tapered tubing, said carrier and vise jaws serving automatically to clamp successive portions of the tube clamps and longitudinally forward the clamps and tubing, means on the tube clamps coöperating with the vise jaws and positioning the tube as it enters the carrier, a stationary heater adapted to direct a flame upon the seam of the tube and weld said seam as it passes and means for adjusting said carrier and vise to adapt it to different sizes of tubes.

15. In a tube welder, a constantly moving tube carrier, a plurality of clamps formed to embrace tapered tubing, said constantly moving carrier comprising a plurality of laterally movable vise jaws for automatically operating compressively to grip successive incoming portions of the tube clamps and move the clamps and tube at a constant speed, a device for controlling the position of the tube and clamps, a stationary heater adapted to direct a welding flame locally upon the tube seam and means for adjusting said carrier to adapt it to different sizes of tubes.

16. In a welding machine, a constantly moving sectional vise, a plurality of tube clamps adapted in pairs to embrace tapered tubing with seam exposed, in combination with a closing mechanism for automatically operating to close the sections of said vise and grip successive portions of the tube clamps fed to the machine, a torch for welding the tube seam while the tube is held in said vise and clamps, and means for regulating the position of the welding flame.

17. In a tube welder, mechanism for feeding the unwelded tube with its seam uppermost, comprising a plurality of tube clamps coöperating in pairs to embrace tapered tubing, in combination with an elongated substantially horizontal traveling vise for constantly receiving and propelling forward the incoming tube clamps and tube, said vise comprising a pair of endless chains having a plurality of movable vise sections arranged in pairs, closing mechanism for automatically closing said pairs of vise sections as they successively move into working position and for maintaining said sections in gripping engagement with the tube and clamps while the tube seam is being welded, a burner arranged above said traveling vise for welding the exposed seam as it is carried along by said vise, and a spreader at the end of the vise for automatically operating to open said vise sections successively.

18. In a tube welder, mechanism for embracing tapered tubing with the seam thereof uppermost and exposed, said mechanism comprising a plurality of tube length clamps in combination with an elongated substantially horizontal traveling vise for continuously receiving and propelling forward the incoming tube, said vise comprising a pair of endless chains having a plurality of movable sections arranged in pairs, closing mechanism for automatically closing said pairs of vise sections as they successively move into working position and for maintaining said sections in clamping engagement with the tube while the tube seam is being welded, a burner arranged above said traveling vise for welding the exposed seam as it is carried along by said vise and a spreader at the end of the vise for automatically operating to open said vise sections successively.

19. In a tube welder, an endless elongated conveyer mechanism adapted constantly to travel in one direction and having a plurality of pairs of laterally movable and pivotally mounted vise jaws, in combination with adjustable side members co-acting with said jaws successively to move them together and to hold them together for a predetermined period, tube clamping blocks formed to embrace tapered tubing with the seam thereof exposed and to be gripped by successively closing vise jaws and thereby compress the tube and move it forward, a burner mounted adjacent the upper side of said mechanism for directing a flame upon the seam of the tube and an entering wedge positioned at the rear end of said mechanism for positively forcing the jaws apart.

20. A tube clamp for tube welding mechanism comprising an elongated member formed with a substantially semi-conical recess on one side and with a portion on the other side alined with one edge bounding the substantially semi-conical recess.

21. A tube clamp for tube welding mechanism, comprising an elongated member, provided with a tapered concavity on one side and a formed portion upon the other alined with one edge of the metal bounding the said concavity.

22. A tube clamp comprising an elongated metallic member formed with a substantially semi-conical recess on one side and with a longitudinal rib upon the other side.

23. A machine for continuously welding the lengths of tapered tubing comprising in combination means for clamping tapered tube lengths, a moving holder for carrying the clamped tube lengths forward in end to end abutment, and a stationary heating element arranged to heat and weld the tube seam as fast as the tube travels.

24. A tube clamp comprising an elongated metallic member formed with a substantially semi-conical recess in one side and with longitudinal guiding means upon the other, the end portions of the clamp being similarly angled.

In testimony whereof, I have hereunto set my hand, this 12th day of November, 1913, in the presence of two subscribing witnesses.

MARSHALL BURNS LLOYD.

Witnesses:
HILDA C. PETERSON,
JOSEPH VAN DREESE.